United States Patent [19]

Rocchietta et al.

[11] Patent Number: 4,628,629
[45] Date of Patent: Dec. 16, 1986

[54] FISHING LURE HAVING A BLADE WITH A VARIABLE WATERFOIL SURFACE

[75] Inventors: Paul Rocchietta; Henry Limouzin, both of Contes, France

[73] Assignee: Sheldons', Inc., Antigo, Wis.

[21] Appl. No.: 692,003

[22] Filed: Jan. 16, 1985

[30] Foreign Application Priority Data

Apr. 19, 1984 [FR] France .................. 84 06455

[51] Int. Cl.[4] .................................... A01K 85/04
[52] U.S. Cl. ........................................... 43/42.19
[58] Field of Search .............. 43/42.19, 42.07, 42.13

[56] References Cited

U.S. PATENT DOCUMENTS 2,906,053 9/1959 Eales et al.
2,907,131 10/1959 Bugge.
3,055,138 9/1962 Mutti ............................. 43/42.13

Primary Examiner—Nicholas P. Godici
Assistant Examiner—G. M. Reid
Attorney, Agent, or Firm—Isaksen, Lathrop, Esch, Hart & Clark

[57] ABSTRACT

A fishing spoon having a blade. The blade includes means for selectively varying the waterfoil surface thereof. In the preferred embodiment, the blade has at least two blade elements having longitudinal axes defining an aperture angle therebetween. Attaching means are included for pivotably attaching at least one element to the remainder of the elements such that at least two of the elements may pivot relative to each other to increase and decrease the aperture angle defined by their longitudinal axes and thus to increase and decrease the waterfoil surface of the blade.

14 Claims, 9 Drawing Figures

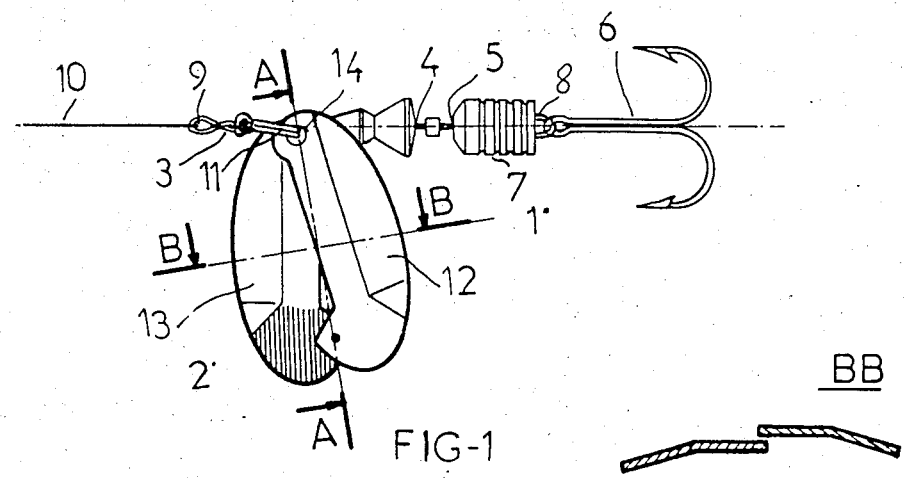
FIG-1
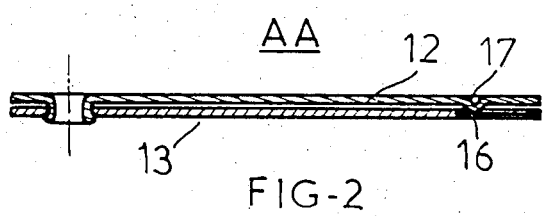
FIG-3
FIG-2
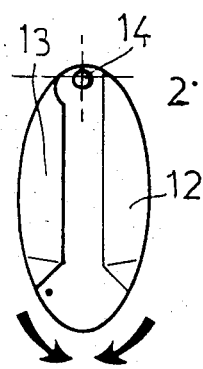
FIG-4
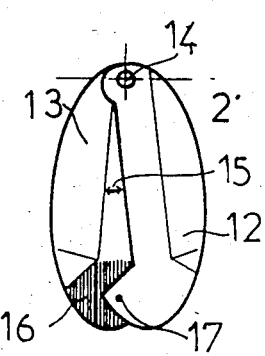
FIG-5
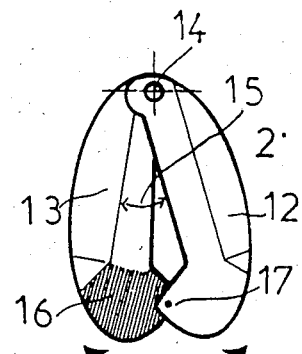
FIG-6
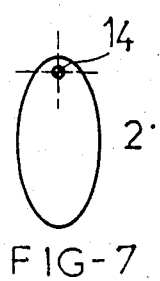
FIG-7
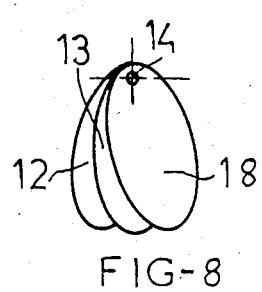
FIG-8
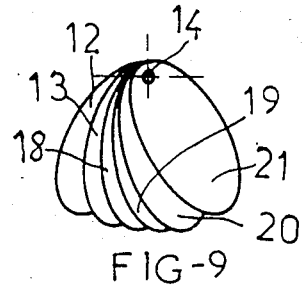
FIG-9

FISHING LURE HAVING A BLADE WITH A VARIABLE WATERFOIL SURFACE

The object that is the invention is a casting spoon or spinner whose blade presents a variable waterfoil surface.

A spoon made in accord with the invention includes a blade mounted on the upper part of a rod whose folded lower end bears a fishhook. A set of stabilization leads defining an oblong body is freely strung lengthwise on the rod. The stabilization leads have a longitudinal hollow in which the beak formed by the curved back end of the folded part of the rod is engaged.

Conventional spoons have blades whose waterfoil surface is constant. Consequently the fisherman must choose the spoon whose waterfoil surface is most adapted to the kind of fishing he wants to practice and also to other conditions encountered or desired. Such conditions include the water current speed, the blade rotation, the lure rise towards the surface, or the lowering of the lure towards the bottom. As soon as the conditions desired change or when the fisherman moves and the spoon must move in a different direction with respect to the current, in order to be able to fish in the best way, the fisherman must change his spoon and choose a spoon whose blade has a waterfoil surface adapted to the new fishing conditions.

The invention tends to solve these difficulties. Modifying the waterfoil surface of a given turning spoon may be required as a consequence of at least three factors: two physical factors and one biological factor.

1. Physical factors:

(a) Current or water flow strength: when by chance (going into a counterflow) or deliberately (counterflow fishing) a spoon is suddenly moving faster than it had been with respect to the water, it reacts mechanically in two combined ways:

speeding up of the blade rotation and rise of the lure towards the surface. To eliminate this double effect, the waterfoil surface of the blade must be reduced. Conversely, if the spoon is suddenly placed into a quicker water flow moving in same direction as the spoon's trajectory (fishing with the current) or is opposed by a reduced current, a deceleration of the blade rotation occurs, and the lure tends to go down to the bottom. To eliminate this double effect, the waterfoil surface of the blade must be enlarged.

(b) Blade rotation speed: the start of the attack of the carnivorous fish is often subject to the blade rotation speed of the lure. In still water, the blade rotation speed is solely subject to the fisherman's retrieval rate. In a current, the blade rotation speed is affected by the speed of the current and the retrieval rate.

In order to allow the fisherman to speed up his retrieval rate without creating the effects described in (a), above, the waterfoil surface of the blade must be reduced. On the other hand, to allow him to decelerate the retrieval rate without compulsorily causing the slowing down of the rotation of the blade and also the lowering of the lure to the bottom (which might result in its loss by snagging) the waterfoil surface of the blade must be enlarged.

2. Biological factor:

Other things being equal, the carnivorous fish is, according to time and place, sensitive to given qualities of "signals," the nature of which the fisherman must discover. These qualities are particularly dependent upon the nature of the vibrations and pulsations created by the blade, as affected by the distance from its axis at which the blade rotates. Reducing or enlarging the waterfoil surface of the blade causes it to move further or nearer to the axis about which the blade revolves. As a result, the quality of the fishing signals may be modulated. The ability to do this constitutes an advantage of the first importance for fishing.

In order to achieve this effect, the spoon of the invention is equipped with devices that allow the waterfoil surface to be varied. The blade is formed of at least two elements. Each element has a hole in it, and a stirrup linked to all of the elements is hooked through the holes of each of them. The stirrup is strung on the rod of the spoon. The elements thus are held together at the location of the holes, which allows them all to be placed onto the stirrup. Each element can also rotate about the axis of the hole where the stirrup is strung. The shape of the elements is such that one of them can at least partially overlap the other.

The elements composing the blade have a common point of attachment. When the aperture angle between the elements is closed or opened, the elements may be caused to be apart, partially overlapped, or completely overlapped, so that the waterfoil surface of the blade thus can be varied.

A device for rapid locking can be set between the various elements to retain the selected overlapping position of one element with respect to another and thus the aperture angle associated with the chosen waterfoil surface. Such a locking device enables the angle to be changed rapidly. The rapid locking device can be put either at the location of the axis of common rotation of the elements around the holes through which the stirrup is strung or at a point where the elements overlap each other. Thus, the device for rapid locking may include scores on the upper service of a lower element of the blade and a spur on the lower surface of the an upper element of the blade. Alternatively, the device for rapid locking allowing rapid adjustment of the size of the waterfoil surface of the blade may be put at the location of the holes through which the stirrup is strung. Thus, the different elements may be held together by a mounting and corrugated rings located at the axis of rotation, to enable the user to select the relative positions of the elements and to retain the overlapping of one element by the other.

The attached drawings are provided merely as an illustrative example to enable easy understanding of the invention. They are not intended to limit the scope of the invention. Instead, they show the preferred embodiment of the invention.

FIG. 1 is a plan view of the spoon.

FIG. 2 is a section view of the spoon represented in FIG. 1, taken along section lines A—A.

FIG. 3 is a section view of the spoon represented in FIG. 1, taken along section lines B—B.

FIG. 4 is a plan view of the blade with the composing elements completely overlapped.

FIG. 5 is a plan view of the blade with the composing elements partially overlapped, thus enlarging the waterfoil surface of the blade.

FIG. 6 is a plan view of the blade with the elements completely apart, the waterfoil surface being maximum.

FIG. 7 is a plan view of the blade composed of several identical elements overlapping each other.

FIG. 8 is a plan view of a blade composed of three elements.

FIG. 9 is a plan view of a blade composed of six elements.

Spoon 1 is composed of a blade 2 that is mounted on the upper part 3 of a rod 4. The lower end 5 of the rod is bent back on itself and bears the hooks 6. A stabilization weight 7 forming an oblong body is freely strung on rod 4 lengthwise and presents endwardly a longitudinal hollow. The curved end 8 of the part of the lower end 5 of rod 4 that is bent back on itself forms a beak that is engaged in the longitudinal hollow.

The upper part 3 of the rod 4 is folded back on itself to form an eyelet 9. The eyelet 9 is intended to be tied to a stabilization line 10, the fisherman's fishing line. The blade 2 is fixed to the rod 4 by a stirrup 11. Conical spacing elements having hole bored therethrough are strung after the stirrup 11 and before the stabilization weight 7.

The blade 2 is composed of at least two blade elements 12 and 13. Each element 12, 13 has a hole 14 adapted to permit the passage therethrough of the stirrup 11, which is itself strung onto the rod 4. Both elements 12, 13 are shaped so that one element 12 can overlap the other element 13 either completely (as in FIG. 4) or partially (as in FIG. 5) or nearly separated (as in FIG. 6).

A locking device is adapted to retain the aperture angle 15 defined between the longitudinal axes of the two elements 12, 13. In the embodiment presented in the Figures referred to, the lower element 13 has scores 16 on its upper surface, while the upper element 12 has a spur 17 that is engagable in the scores 16. As can be seen in FIGS. 4-6, the spur 17 will remain in contact with the scores 16 throughout the full range of blade element positions from completely overlapped (FIG. 4) to nearly separated (FIG. 6), to retain the blades in any set position.

FIGS. 7, 8, and 9 show embodiments of the blade 2 composed of more than two elements 12, 13. For example, FIG. 8 shows three elements 12, 13, and 18 forming a blade 2. FIG. 9 shows six elements 12, 13, 18, 19, 20, and 21 forming a blade 2.

When actually fishing, the effects of the three factors discussed above are merged. The three factors include the two physical factors: waterflow speed and lure blade rotation speed, and the one biological factor discussed. By perceiving the "pulling" and the "action" of his spoon, the fisherman is constantly aware of these factors. He may control the spoon by the only means at his disposal, by accelerating or slowing down his rate of retrieval. Though this means of control is not too precise, it is satisfactory so long as the fisherman's efforts remain within the technical limits of the lure. These limits are made increasingly narrow and constraining by reduction in spoon blade size and by a disturbed or turbulent water flow. Such water turbulence makes the control problem most acute, especially for trout fishing.

When the fisherman perceives that the technical limit of the spoon is exceeded in that the lure no longer "pulls" enough or "pulls" too much, the lure tends to go up or down excessively, or it "works" too intensely or too "lazily," etc., a fisherman using a blade made in accord with the invention has only to set the elements 12, 13 of the blade 2 more or less apart to enlarge or reduce water foil surface. The consequence of the features disclosed is a great flexibility of use, a considerable improvement of the precision with which one may attempt to achieve optimum fishing conditions, and an ability to adapt immediately to the circumstances of a fishing place or a given behavior of fish.

What is claimed is:

1. A fishing spoon comprising a blade having means for selectively varying the waterfoil surface thereof, the said means including at least two blade elements having longitudinal axes defining an aperture angle therebetween and attaching means for pivotably attaching at least one element to the remainder of the elements such that at least two of the elements may pivot relative to each other to increase and decrease the aperture angle defined by their longitudinal axes and thus to increase and decrease the waterfoil surface of the blade, the attaching means including a hole in each of those elements that pivot relative to each other, and a stirrup extending through all such holes, the stirrup being pivotably attached to the remainder of the fishing spoon.

2. A fishing spoon comprising a blade having means for selectively varying the waterfoil surface thereof, the said means including at least two blade elements having longitudinal axes defining an aperture angle therebetween and attaching means for pivotably attaching at least one element to the remainder of the elements such that at least two of the elements may pivot relative to each other around a common axis of rotation to increase and decrease the aperture angle defined by their longitudinal axes and thus to increase and decrease the waterfoil surface of the blade, locking means for locking the elements that pivot relative to each other, the locking means including interactive shapes formed in the pivoting elements at a selected location remote from the common axis of rotation, the pivoting elements being in contact with each other and the interactive shapes including grooves in one of the elements presented toward the other element and a spur in the other element extending toward the grooves and being engageable therein, whereby the user of the fishing spoon may pivot the elements to a desired, overlapping relationship and allow the spur to engage a groove, locking the elements and holding their longitudinal axes in fixed relation to each other to define selectable aperture angles.

3. A fishing spoon comprising a blade having means for selectively varying the waterfoil surface thereof, the said means including at least two blade elements having longitudinal axes defining an aperture angle therebetween and attaching means for pivotably attaching at least one element to the remainder of the elements around a common axis of rotation such that at least two of the elements may pivot relative to each other around a common axis of rotation to increase and decrease the aperture angle defined by their longitudinal axes and thus to increase and decrease the waterfoil surface of the blade, locking means to lock the elements that pivot relative to each other thereby holding their longitudinal axes in fixed relation to each other to define selectable aperture angles, the locking means including interactive shapes formed in the pivoting elements at a selected location adjacent to the common axis of rotation.

4. The fishing spoon of claim 3 wherein the locking means includes at least one corrugated ring substantially surrounding the axis of rotation of the elements.

5. A fishing spoon comprising a blade having means for selectively varying the waterfoil surface thereof, the said means including at least two blade elements having longitudinal axes defining an aperture angle therebetween and attaching means for pivotably attaching at least one element to the remainder of the elements such that at least two of the elements may pivot relative to each other to increase and decrease the aperture angle defined by their longitudinal axes and thus to increase and decrease the waterfoil surface of the blade, locking means to lock the elements that pivot relative to each other thereby holding their longitudinal axes in fixed relation to each other to define selectable aperture angles, the locking means including at least one corrugated ring adjacent to and substantially surrounding the axis of rotation of an element that may pivot relative to at least one remaining element.

6. A fishing spoon having a variable waterfoil surface comprising a blade having at least two pivotably connected, partially overlapping elements, said blade elements being pivotable around a common axis of rotation between a first position wherein the blade elements are substantially overlapping to provide a reduced effective blade width which presents a minimum waterfoil surface and a second position wherein the blade elements are substantially non-overlapping to provide an enlarged effective blade width which presents a greater waterfoil surface, interactive locking shapes formed in the respective pivotable blade elements, said locking shapes being continuously engaged to retain the blades in any selected position from said first position to said second position, said overlapping pivotable blade elements and locking shapes defining a substantially continuous, composite blade which for any selected width functions like a conventional one-piece spoon-type blade having a waterfoil surface of comparable size said blade elements having longitudinal axes defining an aperture angle, the blade elements shaped such that the blade is approximately bilaterally symetrical about the bisector of the aperture angle when the blade elements are set between said first position and said second position.

7. The fishing spoon of claim 6 wherein the interactive locking shapes include grooves in one of the elements presented toward the other element and a spur in the other element extending toward the grooves and being engageable therein, whereby the user of the fishing spoon may pivot the elements to a desired, overlapping relationship and allow the spur to engage a groove, locking the elements in fixed relation to each other.

8. The spoon of claim 6 wherein the interactive locking shapes include at least one corrugated ring substantially surrounding the axis of rotation of the elements.

9. A fishing spoon having a variable waterfoil surface comprising a blade having two pivotally connected, partially overlapping elements, said blade elements being pivotable about a common axis of rotation, between a first position wherein the blade elements are substantially overlapping to provide a reduced effective blade width which presents a minimum waterfoil surface and a second position wherein the blade elements are substantially non-overlapping to provide an enlarged effective blade width which presents a greater waterfoil surface, said overlapping pivotable blade elements defining a substantially continuous, composite blade which for any selected effective blade width functions like a conventional one-piece spoon-type blade having a waterfoil surface of comparable size said blade elements having longitudinal axes defining an aperture angle, the blade elements shaped such that the blade is approximately bilaterally symetrical about the bisector of the aperture angle when the blade elements are set between said first position and said second position, pivotal attachment means for engaging said blade elements at approximately their common axis of rotation and pivotally attaching said elements to the remainder of the fishing spoon.

10. The fishing spoon of claim 32 wherein the blade elements cooperate to form a blade having a substantially symmetrical, oval, concave, spoon-type shape when the blade elements are pivoted to their first position, and which substantially retains a symmetrical, oval, concave, spoon-type shape as the blade elements are pivoted to their second position.

11. The fishing spoon of claim 9 including a hole extending through each of said blade elements at their common axes of rotation, and wherein the pivotal attachment means includes a stirrup extending through such holes and being pivotable attached to the remainder of the fishing spoon.

12. The fishing spoon of claim 9 including locking means for locking the pivotable blade elements relative to each other in selectable positions from the said first position to the said second position.

13. A method for varying the waterfoil surface of the blade of a fishing spool comprising the steps of:
(a) subdividing the blade into at least two blade elements capable of being placed in an overlapping position and having longitudinal axes defining between them an aperture angle; and
(b) pivoting the elements relative to each other to move them between decreasingly and increasingly overlapped positions, thereby increasing and decreasing the aperture angle defined between their longitudinal axes, to increase and decrease the waterfoil surface of the blade; and
(c) forming interactive surface shape means on the surfaces of at least two elements that pivot relative to each other for releasably engaging the pivotable blade elements to each other, the forming of surface shapes including forming grooves in at least one element at a location remote from the axis of rotation about which it pivots and forming a spur in another element adapted to releasably engage the grooves.

14. A method for varying the waterfoil surface of the blade of a fishing spool comprising the steps of:
(a) subdividing the blade into at least two blade elements capable of being placed in an overlapping position and having longitudinal axes defining between them an aperture angle; and
(b) pivoting the elements relative to each other to move them between decreasingly and increasingly overlapped positions, thereby increasing and decreasing the aperture angle defined between their longitudinal axes, to increase and decrease the waterfoil surface of the blade; and
(c) forming interactive surface shape means for releasably engaging the pivotable blade elements to each other, the step of forming surface shapes including forming a corrugated ring in at least one element at a location adjacent to and substantially surrounding the axis of rotation about which it pivots.

* * * * *

UNITED STATES PATENT AND TRADEMARK OFFICE
CERTIFICATE OF CORRECTION

PATENT NO. : 4,628,629

DATED : December 16, 1986

INVENTOR(S) : Paul Rocchietta; Henry Limouzin

It is certified that error appears in the above—identified patent and that said Letters Patent are hereby corrected as shown below:

In claim 10, column 6, line 7, "claim 32" should read --claim 9--.

Signed and Sealed this

Third Day of March, 1987

Attest:

DONALD J. QUIGG

Attesting Officer

Commissioner of Patents and Trademarks